United States Patent
Lundgren et al.

(10) Patent No.: US 8,548,491 B2
(45) Date of Patent: Oct. 1, 2013

(54) METHOD AND SYSTEM FOR INTERNET PROTOCOL INITIAL POSITIONING THROUGH CALIBRATED RANGING

(75) Inventors: David Lundgren, Mill Valley, CA (US); Steven Malkos, San Jose, CA (US)

(73) Assignee: Broadcom Corporation, Irvine, CA (US)

(*) Notice: Subject to any disclaimer, the term of this patent is extended or adjusted under 35 U.S.C. 154(b) by 429 days.

(21) Appl. No.: 12/640,987

(22) Filed: Dec. 17, 2009

(65) Prior Publication Data

US 2011/0151889 A1    Jun. 23, 2011

(51) Int. Cl.
  *H04W 24/00*    (2009.01)
  *H04W 4/00*    (2009.01)
  *H04M 3/42*    (2006.01)
  *H04M 1/66*    (2006.01)

(52) U.S. Cl.
  USPC ............. 455/456.1; 455/414.2; 455/411; 370/338

(58) Field of Classification Search
  USPC ........... 455/456.1, 414.2, 411; 370/338
  See application file for complete search history.

(56) References Cited

U.S. PATENT DOCUMENTS

| | | | |
|---|---|---|---|
| 2005/0232189 A1 | 10/2005 | Loushine | |
| 2007/0030841 A1* | 2/2007 | Lee et al. | 370/352 |
| 2007/0182631 A1* | 8/2007 | Berlinsky et al. | 342/357.15 |
| 2008/0048912 A1* | 2/2008 | Loomis | 342/386 |

OTHER PUBLICATIONS

EPO Communication dated Mar. 31, 2011 in Application No. 10015629.8-2220.

* cited by examiner

*Primary Examiner* — Mahendra Patel
*Assistant Examiner* — Michael Mapa
(74) *Attorney, Agent, or Firm* — Sterne, Kessler, Goldstein & Fox P.L.L.C.

(57) ABSTRACT

A global navigation satellite system (GNSS) enabled mobile device comprising an Internet protocol (IP) interface may be operable to determine a reference position based on a registered public IP address associated with the GNSS enabled mobile device and range uncertainty for the registered public IP address. The GNSS enabled mobile device may identify the registered public IP address associated with the GNSS enabled mobile device and a packet travel time to reach the registered public IP address utilizing a network trace test. The GNSS enabled mobile device may be operable to determine the range uncertainty for the identified registered public IP address and validate the registered public IP address for a reference position based on the determined range uncertainty. The GNSS enabled mobile device may be operable to acquire a latitude/longitude associated with the validated registered public IP address for the reference position.

12 Claims, 6 Drawing Sheets

| Range Uncertainty Threshold 401 | Packet Travel Time 402 |
|---|---|
| 100 km Uncertainty 404 | Maximum 15 msec 406 |
| 1800 km Uncertainty 408 | Maximum 35 msec 410 |

FIG. 4

501  C:\>tracert yahoo.com  ⌒502

Tracing route to yahoo.com [209.191.93.53] over a maximum of 30 hops:

506
```
 1    5 ms    2 ms    2 ms  home [10.0.0.1]
 2   14 ms   13 ms   13 ms  adsl-99-27-135-254.dsl.pltn13.sbcglobal.net [99.27.135.254]  ⌒504
 3  141 ms   54 ms   13 ms  76.246.22.130
 4   14 ms   19 ms   19 ms  bb1-g3-0.pltnca.sbcglobal.net [151.164.43.54]
 5   16 ms   17 ms   15 ms  ex1-p3-0.eqsjca.sbcglobal.net [70.245.63.230]
 6   17 ms   15 ms   13 ms  asn10310-yahoo-10g.eqsjca.sbcglobal.net [151.164.248.58]
 7   58 ms   58 ms   59 ms  as1-pat2.da3.yahoo.com [216.115.101.150]
 8   59 ms   59 ms   60 ms  ae1-p131.msr2.mud.yahoo.com [216.115.104.87]
 9   60 ms   59 ms   67 ms  te-8-1.bas-c1.mud.yahoo.com [68.142.193.5]
10  151 ms   80 ms   59 ms  b1.www.vip.mud.yahoo.com [209.191.93.53]
```

Trace complete.

510  C:\>tracert yahoo.com  ⌒512

Tracing route to yahoo.com [209.191.93.53] over a maximum of 30 hops:

516
```
 1    5 ms    2 ms    2 ms  home [10.0.0.1]
 2   10 ms    9 ms    9 ms  [10.16.1.3]
 3   30 ms   29 ms   29 ms  adsl-99-27-135-254.dsl.pltn13.sbcglobal.net [99.27.135.254]  ⌒514
 4  141 ms   70 ms   33 ms  76.246.22.130
 5   30 ms   35 ms   35 ms  bb1-g3-0.pltnca.sbcglobal.net [151.164.43.54]
 6   32 ms   33 ms   31 ms  ex1-p3-0.eqsjca.sbcglobal.net [70.245.63.230]
 7   33 ms   31 ms   29 ms  asn10310-yahoo-10g.eqsjca.sbcglobal.net [151.164.248.58]
 8   74 ms   74 ms   75 ms  as1-pat2.da3.yahoo.com [216.115.101.150]
 9   75 ms   75 ms   75 ms  ae1-p131.msr2.mud.yahoo.com [216.115.104.87]
10   76 ms   75 ms   83 ms  te-8-1.bas-c1.mud.yahoo.com [68.142.193.5]
11  152 ms   96 ms   75 ms  b1.www.vip.mud.yahoo.com [209.191.93.53]
```

Trace complete.

FIG. 5

METHOD AND SYSTEM FOR INTERNET PROTOCOL INITIAL POSITIONING THROUGH CALIBRATED RANGING

CROSS-REFERENCE TO RELATED APPLICATIONS/INCORPORATION BY REFERENCE

[Not applicable]

FIELD OF THE INVENTION

Certain embodiments of the invention relate to communication systems. More specifically, certain embodiments of the invention relate to a method and system for Internet protocol initial positioning through calibrated ranging.

BACKGROUND OF THE INVENTION

Location based services (LBS) are emerging as a new type of value-added service provided by mobile or wireless communication network service providers. LBS are mobile services in which the location information of mobile devices is used in order to enable various LBS applications such as, for example, enhanced 911 (E-911), location-based 411, location-based messaging and/or local restaurants finding. A position of a mobile device is determined by using, for example, satellite-based systems such as global navigation satellite systems (GNSSs) such as, for example, the global positioning system (GPS), the GLobal NAvigation Satellite System (GLONASS), and the satellite navigation system GALILEO.

A GNSS utilizes an earth-orbiting constellation of a plurality of GNSS satellites each broadcasting GNSS signals which indicates its precise location and ranging information. From any location on or near the earth where the satellites may be visible, a GNSS enabled mobile device may detect GNSS signals and take various GNSS measurements such as pseudorange, carrier phase, and/or Doppler to calculate corresponding navigation information such as a position fix, velocity, and time. The GNSS enabled mobile device utilizes the calculated navigation information for various LBS applications such as E911, location-based 411, location-based messaging and/or friend finding. The LBS applications may be realized using various wireless and/or wired communication networks such as, for example, WCDMA, UMTS, HSDPA, CDMA, EV-DO, GSM, GPRS, EDGE, EGPRS, LTE, short-range wireless (Bluetooth), WiMAX, high-speed wireless LAN (WiFi), and/or wired Internet protocol (IP) networks.

Further limitations and disadvantages of conventional and traditional approaches will become apparent to one of skill in the art, through comparison of such systems with the present invention as set forth in the remainder of the present application with reference to the drawings.

BRIEF SUMMARY OF THE INVENTION

A system and/or method for Internet protocol initial positioning through calibrated ranging, substantially as shown in and/or described in connection with at least one of the figures, as set forth more completely in the claims.

Various advantages, aspects and novel features of the present invention, as well as details of an illustrated embodiment thereof, will be more fully understood from the following description and drawings.

BRIEF DESCRIPTION OF SEVERAL VIEWS OF THE DRAWINGS

FIG. 4 is a block diagram illustrating an exemplary range uncertainty threshold for validating a registered public IP address associated with a GNSS enabled mobile device, in accordance with an embodiment of the invention.

FIG. 5 is a block diagram illustrating an exemplary traceroute, in accordance with an embodiment of the invention.

DETAILED DESCRIPTION OF THE INVENTION

Certain embodiments of the invention can be found in a method and system for Internet protocol initial positioning through calibrated ranging. In various embodiments of the invention, a global navigation satellite system (GNSS) enabled mobile device comprising an Internet protocol (IP) interface may be operable to determine a reference position of the GNSS enabled mobile device based on a registered public IP address associated with the GNSS enabled mobile device and a range uncertainty for the registered public IP address.

In this regard, the GNSS enabled mobile device may be operable to determine the registered public IP address utilizing a network trace test such as, for example, a traceroute to a known public IP address. The GNSS enabled mobile device may be operable to identify the registered public IP address associated with the GNSS enabled mobile device and a packet travel time to reach a network routing device that utilizes the registered public IP address during the network trace test. In this regard, the identified registered public IP address may be a registered IP address of a first public network routing device that is identified and reached during the network trace test such as, for example, the traceroute. The GNSS enabled mobile device may be operable to determine the range uncertainty for the identified registered public IP address associated with the GNSS enabled mobile device based on the packet travel time to reach the registered public IP address. In this regard, the range uncertainty may be, for example, 100 kilometers (km) uncertainty when the packet travel time to reach the registered public IP address is less than or equal to 15 milliseconds (msec), and the range uncertainty may be, for example, 1800 km uncertainty when the packet travel time to reach the registered public IP address is less than or equal to 35 msec and greater than 15 msec. The GNSS enabled mobile device may be operable to validate the registered public IP address for a reference position based on the determined range uncertainty for the registered public IP address. In this regard, for example, the registered public IP address may be a valid registered public IP address for the reference position if the determined range uncertainty for the registered public IP address is a specified uncertainty, for example, 100 km IP address is a specified uncertainty, for example, 100 km uncertainty. The GNSS enabled mobile device may be operable to acquire a latitude/longitude (LAT/LON) of the network routing device that utilizes the validated registered public IP address for the reference position, and the LAT/LON for the reference position and other GNSS navigation data may be used to calculate a position of the GNSS enabled mobile device.

Figure 1:
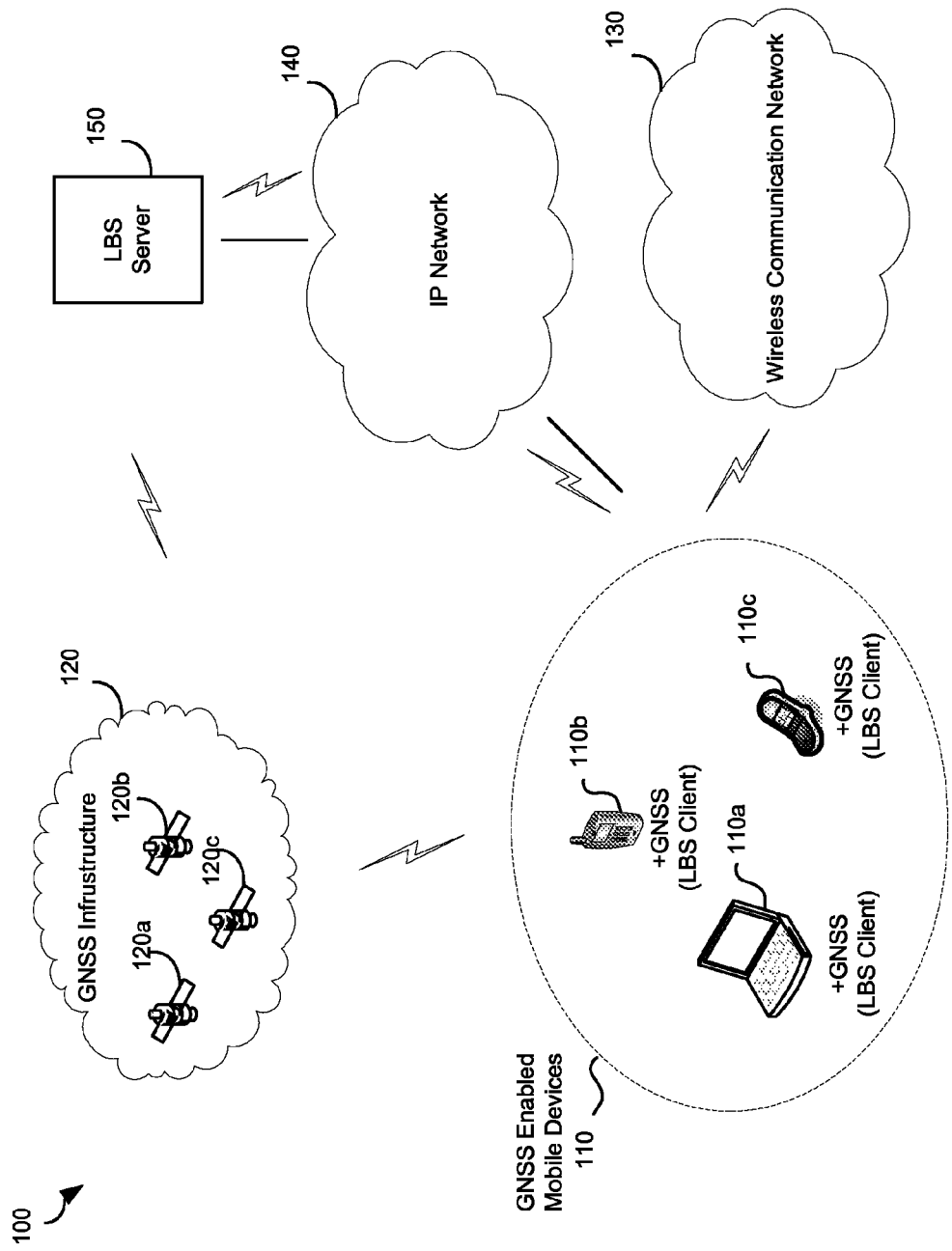
FIG. 1 is a block diagram illustrating an exemplary communication system that is operable to provide Internet protocol initial positioning through calibrated ranging, in accordance with an embodiment of the invention.

FIG. 1 is a diagram illustrating an exemplary communication system that is operable to provide Internet protocol initial positioning through calibrated ranging, in accordance with an embodiment of the invention. Referring to FIG. 1, there is shown a communication system 100. The communication system comprises a plurality of GNSS enabled mobile devices 110, of which GNSS enabled mobile devices 110a-110c are illustrated, a GNSS infrastructure 120, a wireless communication network 130, an IP network 140 and a LBS Server 150. The GNSS infrastructure 120 comprises a plurality of GNSS satellites such as GNSS satellites 120a through 120c.

A GNSS enabled mobile device such as the GNSS enabled mobile device 110a may comprise suitable logic, circuitry, interfaces and/or code that are operable to communicate radio signals across the wireless communication network 130. The GNSS enabled mobile device 110a may be operable to receive GNSS broadcast signals from a plurality of visible GNSS satellites such as GNSS satellites 120a through 120c in the GNSS infrastructure 120. The received GNSS signals may be utilized to determine navigation information or data such as a position fix and/or a velocity of the GNSS enabled mobile device 110a. In order to quickly determine a position, the GNSS enabled mobile device 110a may be operable to acquire positioning assistance information such as, for example, latitude/longitude (LAT/LON) for a reference position (initial position), GNSS assistance data and/or GNSS long term orbit (LTO) assistance data from, for example, the LBS server 150 via the IP network 140 such as the Internet and/or the wireless communication network 130. The determined navigation information or data may be communicated with, for example, the wireless communication network 130 and/or the IP network 140 for various navigation and/or LBS applications such as E911, location-based 411, location-based messaging, etc.

A registered public IP address associated with the GNSS enabled mobile device 110a may be matched up to a reference position associated with the GNSS enabled mobile device 110a in instances when the GNSS enabled mobile device 110a is connected to the IP network 140. There are many commercial and open source solutions that match a public IP address such as, for example, an IPV4 or an IPV6 address to a LAT/LON. The GNSS enabled mobile device 110a may be operable to utilize a network trace test such as, for example, a traceroute to a known public IP address via the IP network 140 to identify a registered public IP address associated with the GNSS enabled mobile device 110a and a packet travel time to reach the location of the registered public IP address. The GNSS enabled mobile device 110a may be operable to determine a range uncertainty for the identified registered public IP address associated with the GNSS enabled mobile device 110a based on the packet travel time to reach the location of the registered public IP address. The distance or range between the location of the registered public IP address associated with the GNSS enabled mobile device 110a and the physical location of the GNSS enabled mobile device 110a may be derived from multiplying the packet travel speed in the IP network 104 by the packet travel time to reach the location of the registered public IP address from the physical location of the GNSS enabled mobile device 110a. A specified uncertainty may indicate that the location of the registered public IP address associated with the GNSS enabled mobile device 110a may be within the specified range of the physical location of the GNSS enabled mobile device 110a.

The GNSS enabled mobile device 110a may be operable to validate the registered public IP address for a reference position based on the determined range uncertainty for the registered public IP address. The GNSS enabled mobile device 110a may be operable to acquire a latitude/longitude (LAT/LON) associated with the location of the validated registered public IP address for the reference position from, for example, the LBS server 150 and/or a LBS client in the GNSS enabled mobile device 110a. The LAT/LON for the reference position and other GNSS navigation data may be used to calculate a position of the GNSS enabled mobile device 110a.

A GNSS satellite such as the GNSS satellite 120a may comprise suitable logic, circuitry, interfaces and/or code that is operable to provide satellite navigational information or data to various GNSS receivers on earth. In an embodiment of the invention, the GNSS receivers, such as GPS, assisted-GPS (AGPS), LTO AGPS, GALILEO or GLONASS receivers, may be integrated within GNSS capable mobile devices such as the GNSS enabled mobile devices 110a through 110c.

The wireless communication network 130 may comprise suitable logic, circuitry, interfaces and/or code that may be operable to provide voice and data services to various mobile devices such as the GNSS enabled mobile devices 110a-110c by using wireless communication technologies such as, for example, WCDMA, UMTS, HSDPA, CDMA, EV-DO, GSM, GPRS, EDGE, EGPRS, LTE, Bluetooth, etc.

The IP network 140 may comprise suitable logic, circuitry, interfaces and/or code that may be operable to provide data communication via various wired and/or wireless technologies such as, for example, DSL, cable modem, WiMAX, WiFi using Internet protocol. The IP network 140 may be operable to provide communication between the LBS server 150 and a plurality of served mobile devices such as the GNSS enabled mobile device 110a.

The LBS server 150 may comprise suitable logic, circuitry, interfaces and/or code that may be operable to retrieve information such as, for example, local hotel addresses or a map of the vicinity of areas of interest. The LBS server 150 may be operable to communicate the retrieved information with various communication devices such as the GNSS enabled mobile device 110a based on an associated position fix. The LBS server 150 may be operable to provide a LAT/LON and/or range uncertainty associated with the registered public IP address for a reference position of a GNSS enabled mobile device 110a.

In operation, a GNSS enabled mobile device such as the GNSS enabled mobile device 110a may be operable to detect and receive GNSS signals from, for example, the GNSS satellites 120a-120c. The GNSS enabled mobile device 110a may be operable to utilize a network trace test such as, for example, a traceroute to a known public IP address via the IP network 140 to identify a registered public IP address associated with the GNSS enabled mobile device 110a and a packet travel time to reach the location of the registered public IP address. The GNSS enabled mobile device 110a may be operable to determine a range uncertainty for the identified registered public IP address associated with the GNSS enabled mobile device 110a based on the packet travel time to reach the registered public IP address. The GNSS enabled mobile device 110a may be operable to validate the registered public IP address for a reference position based on the determined range uncertainty for the registered public IP address. The GNSS enabled mobile device 110a may be operable to acquire a latitude/longitude (LAT/LON) associated with the location of the validated registered public IP address for the reference position from, for example, the LBS server 150 and/or a LBS client in the GNSS enabled mobile device 110*a*. The LAT/LON for the reference position and other GNSS navigation data may be used to calculate a position of the GNSS enabled mobile device 110*a*.

Figure 2:
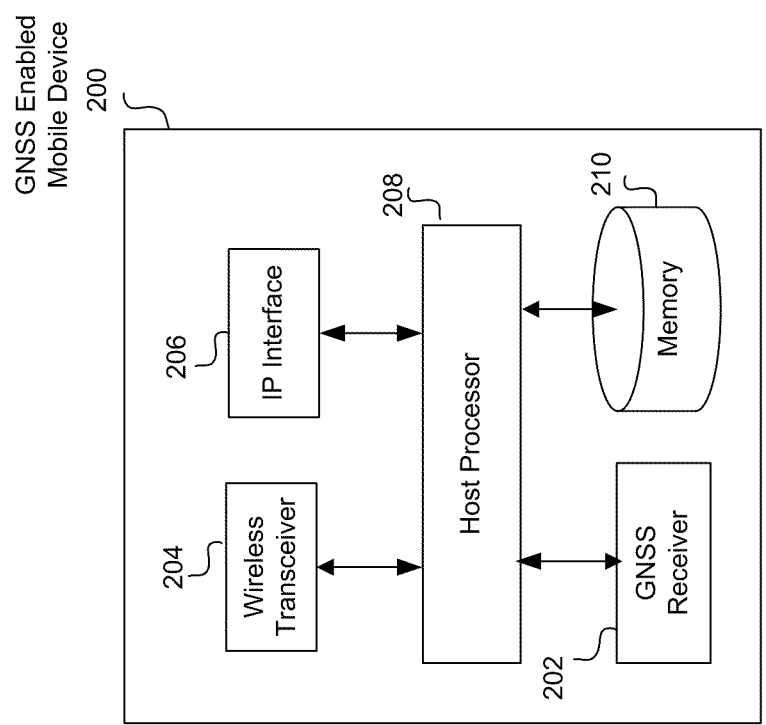
FIG. 2 is a block diagram illustrating an exemplary GNSS enabled mobile device that is operable to provide Internet protocol initial positioning through calibrated ranging, in accordance with an embodiment of the invention.

FIG. 2 is a block diagram illustrating an exemplary GNSS enabled mobile device that is operable to provide Internet protocol initial positioning through calibrated ranging, in accordance with an embodiment of the invention. Referring to FIG. 2, there is shown a GNSS enabled mobile device 200. The GNSS enabled mobile device 200 may comprise a GNSS receiver 202, a wireless transceiver 204, an IP interface 206, a host processor 208 and a memory 210.

The GNSS receiver 202 may comprise suitable logic, circuitry, interfaces and/or code that may be operable to detect and receive GNSS signals from a plurality of visible GNSS satellites 120*a*-120*c*. The GNSS receiver 202 may be operable to utilize the received GNSS signals to calculate navigation information such as a position fix and/or velocity of the GNSS receiver 202. The calculated navigation information may be provided to the host processor 208 to be communicated with the wireless communication network 130 and/or the IP network 140 for various navigation applications such as, for example, location-based 411.

The GNSS receiver 202 may be operable to utilize a network trace test such such as, for example, a traceroute to a known public IP address via the IP interface 206 to identify a registered public IP address associated with the GNSS enabled mobile device 200 and a packet travel time to reach the location of the registered public IP address. The GNSS receiver 202 may be operable to determine a range uncertainty for the identified registered public IP address associated with the GNSS enabled mobile device 200 based on the packet travel time to reach the location of the registered public IP address. The distance or range between the location of the registered public IP address associated with the GNSS enabled mobile device 200 and the physical location of the GNSS enabled mobile device 200 may be derived from multiplying the packet travel speed in the IP network 104 by the packet travel time to reach the location of the registered public IP address from the physical location of the GNSS enabled mobile device 200. A specified uncertainty may indicate that the location of the registered public IP address associated with the GNSS enabled mobile device 200 may be within the specified range of the physical location of the GNSS enabled mobile device 200.

The GNSS receiver 202 may be operable to validate the registered public IP address for a reference position based on the determined range uncertainty for the registered public IP address. The GNSS receiver 202 may be operable to acquire a latitude/longitude (LAT/LON) associated with the location of the validated registered public IP address for the reference position from, for example, the LBS server 150 and/or a LBS client in the GNSS receiver 202. The LAT/LON for the reference position and other GNSS navigation data may be used to calculate a position of the GNSS enabled mobile device 200.

The wireless transceiver 204 may comprise suitable logic, circuitry, interfaces and/or code that may be operable to communicate radio signals over the wireless communication network 130.

The IP interface 206 may comprise suitable logic, circuitry, interfaces and/or code that may be operable to communicate data signals to the IP network 140 using Internet protocol via a wired and/or a wireless connection such as, for example, Ethernet, Ethernet, WiMAX and WiFi.

The host processor 208 may comprise suitable logic, circuitry, interfaces and/or code that may be operable to process signals from the GNSS receiver 202, the wireless transceiver 204 and the IP interface 206. The host processor 208 may be operable to communicate signals with the wireless communication network 130 via the wireless transceiver 204. The host processor 208 may be operable to communicate data signals with the IP network 140 via the IP interface 206. The host processor 208 may be operable to communicate navigation information with the wireless communication network 130 and/or the IP network 140 for various navigation applications such as location-based 411 and/or roadside assistance.

The memory 210 may comprise suitable logic, circuitry, and/or code that operable to store information such as executable instructions and data that may be utilized by the host processor 208. The memory 210 may comprise RAM, ROM, low latency nonvolatile memory such as flash memory and/or other suitable electronic data storage.

In operation, the GNSS receiver 202 may be operable to receive GNSS signals from a plurality of visible GNSS satellites 120*a*-120*c*. The GNSS receiver 202 may be operable to utilize a network trace test such as, for example, a traceroute to a known public IP address via the IP interface 206 to identify a registered public IP address associated with the GNSS enabled mobile device 200 and a packet travel time to reach the location of the registered public IP address. The GNSS receiver 202 may be operable to determine a range uncertainty for the identified registered public IP address associated with the GNSS enabled mobile device 200 based on the packet travel time to reach the location of the registered public IP address. The GNSS receiver 202 may be operable to validate the registered public IP address for a reference position based on the determined range uncertainty for the registered public IP address. The GNSS receiver 202 may be operable to acquire a latitude/longitude (LAT/LON) associated with the location of the validated registered public IP address for the reference position from, for example, the LBS server 150 and/or a LBS client in the GNSS receiver 202. The GNSS receiver 202. The LAT/LON for the reference position and other GNSS navigation data may be used to calculate a position of the GNSS enabled mobile device 200.

Figure 3:
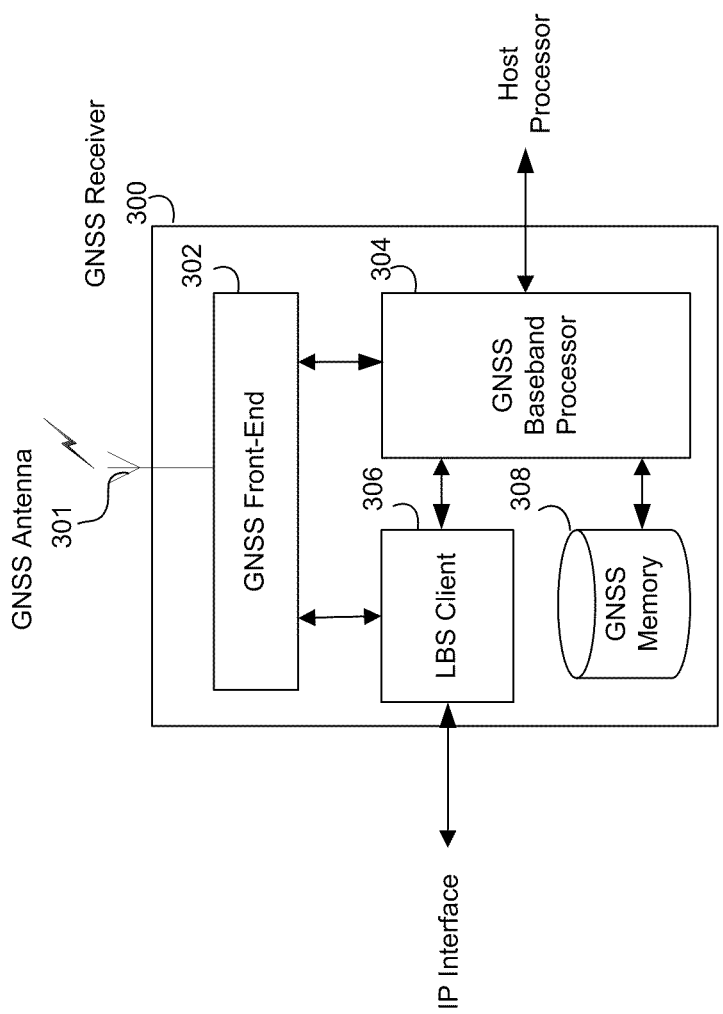
FIG. 3 is a block diagram illustrating an exemplary GNSS receiver that is operable to provide Internet protocol initial positioning through calibrated ranging, in accordance with an embodiment of the invention.

FIG. 3 is a block diagram illustrating an exemplary GNSS receiver that is operable to provide Internet protocol initial positioning through calibrated ranging, in accordance with an embodiment of the invention. Referring to FIG. 3, there is shown a GNSS receiver 300. The GNSS receiver 300 may comprise a GNSS antenna 301, a GNSS front-end 302, a GNSS baseband processor 304, a LBS client 306, and a GNSS memory 308.

The GNSS antenna 301 may comprise suitable logic, circuitry, interfaces and/or code that may be operable to receive GNSS signals from a plurality of visible GNSS satellites such as the GNSS satellites 120*a* through 120*c*. The GNSS antenna 301 may be operable to communicate the received GNSS signals to the GNSS front-end 302 for further processing.

The GNSS front-end 302 may comprise suitable logic, circuitry, interfaces and/or code that may be operable to convert the received GNSS signals to GNSS baseband signals, which may be suitable for further processing in the GNSS baseband processor 304. The GNSS front-end 302 may be operable to detect and track GNSS signals.

The GNSS baseband processor 304 may comprise suitable logic, circuitry, interfaces and/or code that may be operable to process GNSS baseband signals from the GNSS front-end 302 to extract the information and data bits conveyed in the received GNSS signals. The GNSS baseband processor 304 may be operable to perform functions such as clock recovery, channel selection, demodulation, and/or decoding. The GNSS baseband processor 304 may be operable to calculate navigation information or data such as a position fix using the GNSS baseband signals from the GNSS front-end 302 and/or the positioning assistance information such as the LAT/LON for a reference position from the LBS client 306. The GNSS baseband processor 304 may be operable to communicate the calculated navigation information or data with the host processor 208 or data with the host processor 208 for various navigation applications such as E911 supported by the wireless communication network 130 and/or the IP network 140.

The LBS client 306 may comprise suitable logic, circuitry, interfaces and/or code that may be operable to provide LBS user portal function through which interaction with the localized information may be queried or accessed. The LBS client 306 may be operable to utilize a network trace test such as, for example, a traceroute to a known public IP address via the IP interface 206 to identify a registered public IP address associated with the GNSS receiver 300 and a packet travel time to reach the location of the registered public IP address. The LBS client 306 may be operable to determine a range uncertainty for the identified registered public IP address associated with the GNSS receiver 300 based on the packet travel time to reach the location of the registered public IP address.

The distance or range between the location of the registered public IP address associated with the GNSS receiver 300 and the physical location of the GNSS receiver 300 may be derived from multiplying the packet travel speed in the IP network 104 by the packet travel time to reach the location of the registered public IP address from the physical location of the GNSS receiver 300. A specified uncertainty may indicate that the location of the registered public IP address associated with the GNSS receiver 300 may be within the specified range of the physical location of the GNSS receiver 300.

The LBS client 306 may be operable to validate the registered public IP address for a reference position based on the determined range uncertainty for the registered public IP address. The LBS client 306 may be operable to acquire a latitude/longitude (LAT/LON) associated with the location of the validated registered public IP address for the reference position from, for example, the LBS server 150 and/or a public database copied and stored in the LBS client 306. The LAT/LON for the reference position and other GNSS navigation data may be used by the GNSS baseband processor 304 to calculate a position (position fix) of the GNSS receiver 300.

The GNSS memory 308 may comprise suitable logic, circuitry, interfaces and/or code that may enable storage of information such as executable instructions and data that may be utilized by the GNSS baseband processor 304. The executable instructions may be utilized to calculate a position fix of the GNSS receiver 300 using GNSS measurements. The data may comprise the determined position fix of the GNSS receiver 300. The GNSS memory 308 may comprise RAM, ROM, low latency nonvolatile memory such as flash memory and/or other suitable electronic data storage.

In operation, the GNSS antenna 301 may be operable to receive GNSS signals for GNSS measurements. The GNSS front-end 302 may be operable to process the received GNSS signals and convert into GNSS baseband signals. The converted GNSS baseband signals may be communicated with the GNSS baseband processor 304 for GNSS baseband processing. The processed GNSS baseband signals may be used to calculate a position fix of the GNSS receiver 300. The calculated position fix may be forward to the host processor 210 for a navigation application. The LBS client 306 may be operable to utilize a network trace test such as, for example, a traceroute to a known public IP address via the IP interface 206 to identify a registered public IP address associated with the GNSS receiver 300 and a packet travel time to reach the location of the registered public IP address. The LBS client 306 may be operable to determine a range uncertainty for the identified registered public IP address associated with the GNSS receiver 300 based on the packet travel time to reach the location of the registered public IP address. The LBS client 306 may be operable to validate the registered public IP address for a reference position based on the determined range uncertainty for the registered public IP address. The LBS client 306 may be operable to acquire a latitude/longitude (LAT/LON) associated with the location of the validated registered public IP address for the reference position from, for example, the LBS server 150 and/or a public database copied and stored in the LBS client 306. The LAT/LON for the reference position and other GNSS navigation data may be used by the GNSS baseband processor 304 to calculate a position (position fix) of the GNSS receiver 300.

FIG. 4 is a block diagram illustrating an exemplary range uncertainty threshold for validating a registered public IP address associated with a GNSS enabled mobile device, in accordance with an embodiment of the invention. Referring to FIG. 4, there is shown a range uncertainty threshold 401 and a packet travel time 402. The range uncertainty threshold 401 may comprise two levels, a 100 km uncertainty 404 and a 1800 km uncertainty 408. The packet travel time 402 associated with the 100 km uncertainty 404 is maximum 15 msec 406. The packet travel time 402 associated with the 1800 km uncertainty 408 is maximum 35 msec 410. In the exemplary embodiment of the invention illustrated in FIG. 4, two range uncertainty threshold levels are shown. Notwithstanding, the invention is not so limited and the number of range uncertainty threshold levels may be different. The distance or range between the location of a registered public IP address associated with a GNSS enabled mobile device 200 and the physical location of the GNSS enabled mobile device 200 may be derived from multiplying the packet travel speed in the IP network 104 by the packet travel time to reach the location of the registered public IP address from the physical location of the GNSS enabled mobile device 200.

The packet travel time may be discovered by utilizing a network trace test such as, for example, a traceroute. In instances when the packet travel time 402 is less than or equal to the maximum 15 msec 406, the 100 km uncertainty 404 may indicate that the location of the registered public IP address associated with the GNSS enabled mobile device 200 may be within 100 km range of the physical location of the GNSS enabled mobile device 200. In instances when the packet travel time 402 is less than or equal to the maximum 35 msec 410 and greater than the maximum 15 msec 406, the 1800 km uncertainty 408 may indicate that the location of the registered public IP address associated with the GNSS enabled mobile device 200 may be within 1800 km range yet more than 100 km away. For example, in instances when the GNSS enabled mobile device 200 is connected to a virtual private network (VPN) several thousand kilometers away, the public IP address that is registered may be the public IP address of the network node the GNSS enabled mobile device 200 is connected to which may be several thousand kilometers away, not where the GNSS enabled mobile device 200 physically is. physically is. The range uncertainty information or database illustrated in FIG. 4 may be generated and stored in the LBS client 306 and/or the LBS server 150. The range uncertainty for the registered public IP address associated with the GNSS enabled mobile device 200 may be provided by the LBS client 306 and/or the LBS server 150.

In an exemplary embodiment of the invention, the registered public IP address associated with the GNSS enabled mobile device 200 may be a valid IP address for a reference position of the GNSS enabled mobile device 200 if the range uncertainty for the registered public IP address is, for example, 100 km uncertainty 404. The LAT/LON associated with the location of the valid registered public IP address and other GNSS navigation data may be used to calculate a position of the GNSS enabled mobile device 200.

FIG. 5 is a block diagram illustrating an exemplary traceroute, in accordance with an embodiment of the invention. Referring to FIG. 5, there is shown a tracert yahoo.com 501 and a tracert yahoo.com 510. The tracert yahoo.com 501 or 510 works by increasing the "time-to-live" value of each successive batch of packets sent. The first three packets sent have a time-to-live (TTL) value of one (implying that they are not forwarded by the first router and make only a single hop). The next three packets have a TTL value 2, and so on. When a packet passes through a host or network routing device, normally the host decrements the TTL value by one, and forwards the packet to the next host. When a packet with a TTL of one reaches a host, the host discards the packet and sends an ICMP time exceeded packet to the sender. The traceroute utility uses these returning packets to produce a list of hosts such as adsl-99-27-135-254.dsl.pltn13.sbcglobal.net [99.27.135.254] 504 or 514 that the packets have traversed to the destination yahoo.com [209.191.93.53] 502 or 512. The three timestamp values returned for each host along the path are the delay (packet travel time) values typically in milliseconds (ms) for each packet in the batch such as, for example, 14 ms 506 or 30 ms 516.

In the tracert yahoo.com 501, [99.27.135.254] 504 is the first public IP address reached during the traceroute and may be identified as the registered public IP address associated with the GNSS enabled mobile device 200. The packet travel time to reach [99.27.135.254] 504 is 14 msec 506 which is less than 15 msec. According to the range uncertainty threshold 401 described with respect to FIG. 4, the range uncertainty for [99.27.135.254] 504 may be 100 km uncertainty 404. In an exemplary embodiment of the invention, [99.27.135.254] 504 may be classified as a valid registered public IP address for a reference position of the GNSS enabled mobile device 200, and a LAT/LON may be provided to match [99.27.135.254] 504 for a reference position of the GNSS enabled mobile device 200.

In the tracert yahoo.com 510, [99.27.135.254] 514 is the first public IP address reached during the traceroute and may be identified as the registered public IP address associated with the GNSS enabled mobile device 200. The packet travel time to reach [99.27.135.254] 514 is 30 msec 516 which is less than 35 msec and greater than 15 msec. According to the range uncertainty threshold 401 described with respect to FIG. 4, the range uncertainty for [99.27.135.254] 514 may be 1800 km uncertainty 404. In an exemplary embodiment of the invention, [99.27.135.254] 514 may be classified as an invalid registered public IP address for a reference position of the GNSS enabled mobile device 200, and therefore no LAT/LON may be provided to match [99.27.135.254] 514.

Figure 6:
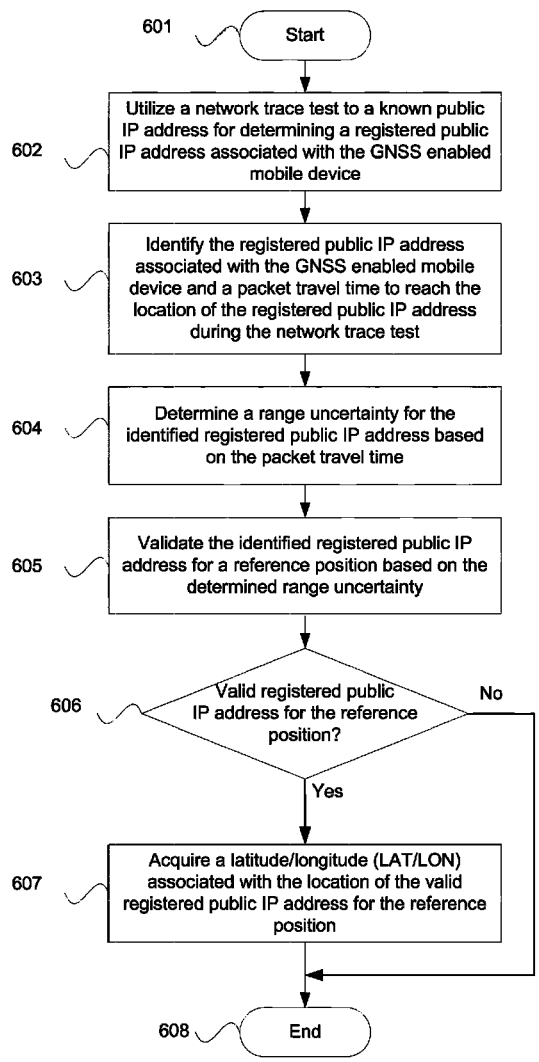
FIG. 6 is a flow chart illustrating exemplary steps for Internet protocol initial positioning through calibrated ranging, in accordance with an embodiment of the invention.

FIG. 6 is a flow diagram illustrating exemplary steps for Internet protocol initial positioning through calibrated ranging, in accordance with an embodiment of the invention. Referring to FIG. 6, the exemplary steps start at step 601. In step 602, the GNSS enabled mobile device 200 may be operable to utilize a network trace test, for example, a traceroute to a known public IP for determining a registered public IP address associated with the GNSS enabled mobile device 200. In step 603, the GNSS enabled mobile device 200 may be operable to identify the registered public IP address associated with the GNSS enabled mobile device 200 and a packet travel time to reach the location of the registered public IP address during the network trace test. In step 604, the GNSS enabled mobile device 200 may be operable to determine a range uncertainty for the identified registered public IP address based on the packet travel time utilizing, for example, the LBS client 306 and/or the LBS server 150. In step 605, the GNSS enabled the GNSS enabled mobile device 200 may be operable to validate the identified registered public IP address for a reference position based on the determined range uncertainty. In step 606, the validity of the registered public IP address for the reference position is checked. In instances when the registered public IP address is a valid registered IP address for the reference position, the exemplary steps may proceed to step 607. In step 607, the GNSS enabled mobile device 200 may be operable to acquire a latitude/longitude (LAT/LON) associated with the location of the valid registered public IP address for the reference position from, for example, the LBS server 105 and/or the LBS client 306. The exemplary steps may proceed to the end step 608. In step 606, in instances when the registered public IP address is not a valid registered public IP address for the reference position, the exemplary steps may proceed to the end step 608.

In various embodiments of the invention, a GNSS enabled mobile device 200 comprising an IP interface 206 may be operable to determine a reference position of the GNSS enabled mobile device 200 based on a registered public IP address associated with the GNSS enabled mobile device 200 and range uncertainty for the registered public IP address. In this regard, the GNSS enabled mobile device 200 may be operable to determine the registered public IP address 504, 514 utilizing a network trace test such as, for example, a traceroute 501, 510 to a known public IP address 502, 512. The GNSS enabled mobile device 200 may be operable to identify the registered public IP address 504, 514 associated with the GNSS enabled mobile device 200 and a packet travel time 506, 516 to reach a network routing device that utilizes the registered public IP address 504, 514 during the network trace test. In this regard, the identified registered public IP address 504, 514 may be a registered IP address 504, 514 of a first public network routing device that is identified and reached during the network trace test such as, for example, the traceroute 501, 510.

The GNSS enabled mobile device 200 may be operable to determine the range uncertainty for the identified registered public IP address 504, 514 associated with the GNSS enabled mobile device 200 based on the packet travel time 506, 516 to reach the registered public IP address 504, 514. In this regard, the range uncertainty may be, may be, for example, 100 km uncertainty 404 when the packet travel time 506 to reach the registered public IP address 504 is less than or equal to 15 msec 406, and the range uncertainty may be, for example, 1800 km uncertainty 408 when the packet travel time 516 to reach the registered public IP address 514 is less than or equal to 35 msec 410 and greater than 15 msec 406. The GNSS enabled mobile device 200 may be operable to validate the registered public IP address 504, 514 for a reference position based on the determined range uncertainty for the registered public IP address 504, 514. In this regard, for example, the registered public IP address 504 may be a valid registered public IP address 504 for the reference position if the determined range uncertainty for the registered public IP address is a specified uncertainty, for example, 100 km uncertainty 404. The GNSS enabled mobile device 200 may be operable to acquire a LAT/LON of the network routing device that utilizes the validated registered public IP address 504 for the reference position, and the LAT/LON for the reference position and other GNSS navigation data may be used to calculate a position of the GNSS enabled mobile device 200.

Another embodiment of the invention may provide a machine and/or computer readable storage and/or medium, having stored thereon, a machine code and/or a computer program having at least one code section executable by a machine and/or a computer, thereby causing the machine and/or computer to perform the steps as described herein for Internet protocol initial positioning through calibrated ranging.

Accordingly, the present invention may be realized in hardware, software, or a combination of hardware and software. The present invention may be realized in a centralized fashion in at least one computer system or in a distributed fashion where different elements are spread across several interconnected computer systems. Any kind of computer system or other apparatus adapted for carrying out the methods described herein is suited. A typical combination of hardware and software may be a general-purpose computer system with a computer program that, when being loaded and executed, controls the computer system such that it carries out the methods described herein.

The present invention may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed is:

1. A method for communication, performed by one or more circuits in a global navigation satellite system (GNSS) enabled mobile device comprising an Internet protocol (IP) interface, the method comprising:
    identifying to registered public IP address and is packet travel time to reach a network routing device that utilizes said registered public IP address during a network trace test;
    determining a range for said identified registered public IP address associated with said GNSS enabled mobile device based on said packet travel time to reach said registered public IP address;
    validating said registered public IP address, wherein said registered public IP address comprises a valid registered public IP address when said determined range is within a threshold range; and
    determining a reference position of said GNSS enabled mobile device based on said valid registered public IP address associated with said GNSS enabled mobile device and said range for said valid registered public IP address.

2. The method according to claim 1, wherein the identifying comprises identifying said registered public IP address utilizing said network trace test to a known public IP address.

3. The method according to claim 2, comprising determining said registered public IP address utilizing a traceroute to said known public IP address.

4. The method according to claim 1, wherein said identified registered public IP address comprises a registered IP address of a first public network routing device that is identified and reached during said network trace test.

5. The method according to claim 1, wherein said range comprises 100 kilometers (km) when said packet travel time to each said registered public IP address is less than or equal to 15 milliseconds (msec), and said range comprises a range within 100 km to 1800 km when said packet travel time to reach said registered public IP address is less than or equal to 35 msec and greater than 15 msec.

6. The method according to claim 1, comprising acquiring a latitude/longitude (LAT/LON) of said network routing device that utilizes said validated registered public IP address for said reference position, wherein said LAT/LON for said reference position and other GNSS navigation data are used to calculate a position of said GNSS enabled mobile device.

7. A system for communication, the system comprising:
    one or more circuits for use in a global navigation satellite system (GNSS) enabled mobile device, the GNSS enabled mobile device comprising an Internet protocol (IP) interface, wherein said one or more circuits are configured to: identify a registered public IP address and a packet travel time to reach a network routing device that utilizes said registered public IP address during a network trace test; determine a range for said identified registered public IP address associated with said GNSS enabled mobile device based on said packet travel time to reach said registered public IP address; validate said registered public IP address, wherein said registered public IP address comprises a valid registered public IP address when said determined range is within a threshold range; and determine a reference position of said GNSS enabled mobile device based on said valid registered public IP address associated with said GNSS enabled mobile device and said range for said valid registered public IP address.

8. The system according to claim 7, wherein said one or more circuits are configured to identify said registered public IP address utilizing said network trace test to a known public IP address.

9. The system according to claim 8, wherein said one or more circuits are configured to determine said registered public IP address utilizing a traceroute to said known public IP address.

10. The system according to claim 7, wherein said identified registered public IP address comprises a registered IP address of a first public network routing device that is identified and reached during said network trace test.

11. The system according to claim 7, wherein said range comprises a range within 100 km when said packet travel time to reach said registered public IP address is less than or equal to 15 msec, and said range comprises a range within 100 km to 1800 km when said packet travel time to reach said registered public IP address is less than or equal to 35 msec and greater than 15 msec.

12. The system according to claim 7, wherein said one or more circuits are configured to acquire a latitude/longitude (LAT/LON) of said network routing device that utilizes said validated registered public IP address for said reference position, and said LAT/LON for said reference position and other GNSS navigation data are used to calculate a position of said GNSS enabled mobile device.

\* \* \* \* \*

UNITED STATES PATENT AND TRADEMARK OFFICE
CERTIFICATE OF CORRECTION

PATENT NO.        : 8,548,491 B2
APPLICATION NO.   : 12/640987
DATED             : October 1, 2013
INVENTOR(S)       : David Lundgren Page 1 of 1

It is certified that error appears in the above-identified patent and that said Letters Patent is hereby corrected as shown below:

In the Claims:

Claim 1, column 11, line 54, please replace "identifying to registered" with --identifying a registered--.

Claim 1, column 11, line 54, please replace "and is packet" with --and a packet--.

Claim 5, column 12, line 15, please replace "comprises 100 kilometers (km)" with --comprises a range within 100 kilometers (km)--.

Claim 5, column 12, line 16, please replace "time to each said" with --time to reach said--.

Signed and Sealed this
Eighth Day of July, 2014

Michelle K. Lee
*Deputy Director of the United States Patent and Trademark Office*